United States Patent Office 2,891,965
Patented June 23, 1959

2,891,965
PREPARATION OF HETEROCYCLIC COMPOUNDS

Sterling E. Voltz, Chester, and Jack H. Krause, Media, Pa., and William E. Erner, Wilmington, Del., assignors to Houdry Process Corporation, Wilmington, Del., a corporation of Delaware No Drawing. Application October 3, 1956
Serial No. 613,615

3 Claims. (Cl. 260—319)

The present invention relates to improved methods for the preparation of heterocyclic compounds containing one or more O, N, or S atoms in the ring, utilizing novel catalysts for effecting ring closure of suitable intermediates by dehydrocyclization.

In copending application Serial No. 545,737, filed November 8, 1955, methods are described for the preparation of indole and indole derivatives by dehydrocyclization of ortho alkyl anilines over supported noble metal catalysts. The catalysts particularly described are those containing platinum or palladium supported on a preferably non-acidic carrier, a described example of which is platinum-on-alumina catalyst which is substantially free of halide. Such catalyst can be prepared, for example, by impregnation of the carrier with halide-free noble metal compound or by appropriate steaming of activated alumina which has been impregnated with chloroplatinic acid. Unpublished word by the present inventors and their associates has also demonstrated the utility of supported platinum and palladium catalysts, and particularly such catalysts when substantially free of halide or other components conferring activity in promoting acid-catalyzed reactions, for ring closure reactions producing isocyclic as well as numerous types of heterocyclic compounds.

It has now been found that improved operation in processes involving catalytic dehydrocyclization to produce heterocyclic compounds containing O, N, or S in the heterocyclic ring is obtained when employing special platinum-alumina catalyst prepared by methods involving vapor phase sulfidation in dried state of a porous carrier impregnated with a platinum compound or complex, and subsequent reduction of the sulfidation product formed thereby. In the use of such platinum catalysts for the aforesaid purpose, contrary to previous experience, it is apparently not material whether the impregnation of the carrier is effected with a soluble halide salt or complex of platinum or by way of a platinum material free from halide. Nor have any appreciable differences been observed in unit activity or selectivity of such catalysts as determined by yields of the desired heterocyclic compounds produced therewith, whether or not the sulfide-treated catalyst employed contains residual halide, which is all the more surprising in view of the important differences observed for the effect of halide content in the case of platinum-alumina catalysts which have not been subjected to the aforesaid sulfide treatment.

The described sulfide-treated noble metal catalysts can be beneficially utilized in a large variety of catalytic vapor or mixed liquid-vapor reactions leading to the formation of heterocyclic nitrogen ring compounds by way of intra or inter molecular condensation or dehydrocyclization including among these, and without limitation thereto:

(1) Production of indole from o-ethyl aniline, and, likewise, the analogous production of substituted indoles from appropriate starting materials, for example the production of selected amino indoles from the isomeric diamino ethyl benzenes.

(2) Production of imidazoles from acylated alkylene diamines, for example 2-methyl imidazole by dehydrocyclization of acetylated ethylene diamine.

(3) Production of pyrrocoline compounds from alkyl or alkenyl pyridines, and benzpyrrocolines from alkaryl and aralkyl pyridines.

(4) Preparation of carbazole compounds by dehydrocyclization of 2-aryl aniline compounds, for example the conversion of 2-amino biphenyl to carbazole.

In similar manner when starting with S and O analogues of the above nitrogen compounds, the corresponding hetero compounds are obtained, thus:

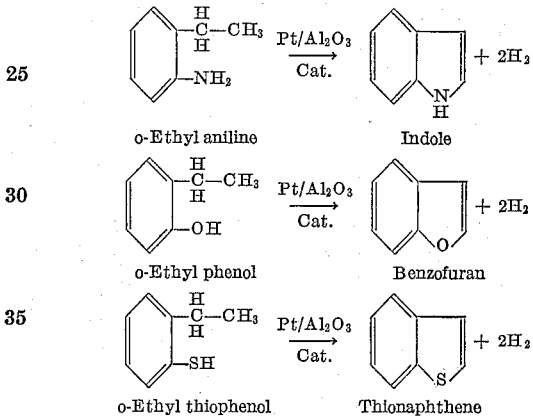

The foregoing are typical of the many and varied hetero ring closure reactions that can be beneficially promoted by the catalysts prepared in accordance with the invention. The desired catalysts are prepared by first forming granules of a suitable carrier having the dry, large surface area and mechanical properties to be expected of catalyst carrier granules; subsequently impregnating such granules with an aqueous solution of a platinum compound such as chloroplatinic acid (or, alternatively, diaminoplatinous nitrite or platinum bisethylenediamine or other dissolved or dispersed platinum compounds) whereby the granules contain from about 0.1 to about 2% platinum; subjecting the platinum-impregnated granules to drying conditions sufficiently severe to reduce the water content to not more than 1 mg./m.² (one milligram of water per square meter of surface area of the carrier); subjecting the impregnated, dried granules to an atmosphere containing, as the principal reactant, a significant amount of sulfiding gas such as hydrogen sulfide, in an amount in excess of, and ordinarily many times in excess of, one-sixth the weight of the platinum (thus ordinarily being greatly in excess of the stoichiometric amount theoretically necessary for converting all of the platinum compound to platinum sulfide but without asserting exactly what chemical compounds are formed), whereby the granule is sulfided.

Conversion of the sulfided platinum to the metallic platinum is effected by subjecting the sulfided particles to reduction, preferably in a stream of hydrogen at temperatures in the range of 500–1000° F. utilizing an amount of hydrogen at least several times the stoichiometric equivalent of the sulfur content of the catalyst. The treating gas may be reused or recycled, provided that hydrogen content is maintained at least about 20 mols/mol of $H_2S$ therein. Such hydrogen treatment may be applied as a factory operation in the preparation of the catalyst, or the catalyst may be shipped to users in sulfided form and the reduction effected in the catalytic reaction vessel during use in ring closure condensation reactions, or preferably prior to introduction of the charge for such reactions. Complete reduction to metallic platinum is not essential and in some instances it may be preferred to retain up to about 10% of the platinum in sulfided state.

The preferred sulfiding temperature is at about 350° F. for two hours, or at about 300° F. for four hours. Alternatively higher temperatures, such as about 900° F., may be employed for a shorter treating time. The sulfiding temperature, however, must not be permitted to exceed 1000° F. at about which temperature adverse effects on the catalyst properties might be had.

The preferred catalyst carrier is activated alumina having a surface area of at least 40 square meters per gram. Other useful carriers include partially deactivated silica-alumina gel cracking catalyst prepared by steaming of the dried gel at elevated temperature until the surface area is reduced to below about 100 square meters per gram. Silica-alumina carrier of reduced cracking activity is also available as spent catalyst from prolonged use in cracking.

The advantages of the sulfided catalyst in the types of reactions described are illustrated by the operation hereinafter described, comparing sulfided and non-sulfided catalyst.

*Example I*

Catalyst A was prepared by treating pellets of an activated alumina base, having a surface area of 75–85 square meters per gram, with acetic acid solution followed by drying and calcination in air 900° F. The calcined pellets were dipped in chloroplatinic acid solution in an amount sufficient to deposit approximately 0.5% Pt by weight on the pellets, then dried.

Catalyst B was made from a sample prepared similarly to Catalyst A and further subjecting the same to reduction in hydrogen for one-half hour at 900° F., steaming the reduced pellets for 48 hours at 900° F. with a mixture of 67% $H_2O$ and 33% $H_2$, followed by treatment in hydrogen at 900° F. for an additional half-hour. The final catalyst contained approximately 0.1% residual Cl.

Catalyst C was made by subjecting a sample of pelleted catalyst prepared in the same manner as Catalyst A above, to treatment for four hours at 300° F. in a gas consisting of 75 mol percent $N_2$ and 25 mol percent $H_2S$.

Catalyst D was prepared by subjecting a portion of Catalyst C following sulfidation to treatment for ten hours at 900° F. in a gas consisting of 75% steam and 25% nitrogen. The final catalyst contained approximately 0.1% residual Cl.

Each of the above catalysts was separately employed in the dehydrocyclization of o-ethyl aniline in the following manner. The catalyst was loaded into a reactor and initially treated therein prior to each run with hydrogen gas at 460° C. for one hour. The o-ethyl aniline was heated to effect vaporization and the vapors passed over the catalyst at approximately atmospheric pressure and at a temperature of 460° C. together with nine mols of $H_2$ per mol of o-ethyl aniline, at the rate of one volume per hour (based on liquid) per volume of catalyst. The results are shown in the following table:

| Catalyst | On Stream (hours) | Indole in Liquid Product (wt., percent) | Yields (wt., percent of charge) | | |
|---|---|---|---|---|---|
| | | | Liquid Product | $H_2$ | Gaseous Prod. | Total Wt. Bal. |
| A | 1 | 48 | 95 | 0.9 | 5.5 | 102 |
| | 2 | 36 | | | | |
| | 3 | 30 | | | | |
| | 4 | 24.5 | | | | |
| B | 1 | 49 | 95.8 | 0.3 | 2.8 | 100 |
| | 2 | 39.5 | | | | |
| | 3 | 35 | | | | |
| | 4 | 30 | | | | |
| C | 1 | 54.5 | 94.5 | 1.4 | 3.3 | 100 |
| | 2 | 46 | | | | |
| | 3 | 41 | | | | |
| | 4 | 36 | | | | |
| D | 1 | 54 | 95.0 | 1.8 | 0 | 97 |
| | 2 | 46 | | | | |
| | 3 | 42.5 | | | | |
| | 4 | 37 | | | | |

It will be seen from the above-tabulated results that the sulfided catalysts (C and D), with or without the steaming step, produced higher initial yields and retained a higher activity in the production of indole than Catalysts A and B which had not been sulfided. Furthermore, from a comparison of the yields in the case of Catalysts C and D it appears that steaming to remove chloride has no appreciable effect, in contrast to the comparison between Catalysts A and B wherein the activity in use declines considerably more rapidly with the use of unsteamed catalyst.

*Example II*

Ethylene diamine is admixed with an equal quantity by weight of C.P. acetic acid (3 mols diamine to 3.5 mols acid) permitting an exothermic temperature rise from the heat of neutralization which will put the reagents into mutual solution. The homogeneous liquid mixture is cooled to about 100° C., then charged through a continuous reactor equipped with a preheater section, the reactor section proper being filled with platinum catalyst corresponding to Catalyst C described above. The reactor section is maintained at approximately 800–820° F. and there is added to the ethylene diamine charge 4 mols hydrogen gas per mol diamine, the liquid mixture being charged at 0.75 volume per hour per volume of catalyst. The vaporous reaction effluent is condensed to obtain a crystalline product comprising 2-methyl imidazole and the mother liquor is redistilled for the further recovery of 2-methyl imidazole.

By the use of other carboxylic compounds for reaction with ethylene diamine, the corresponding alkyl imidazoles are obtained; thus, by reaction of ethylene diamine with propionic acid, 2-ethyl imidazole is formed. Instead of employing ethylene diamine, by the reaction of propylene diamine with acetic acid, 2,4-dimethyl imidazole is formed.

*Example III*

2-benzyl pyridine is vaporized and the vapors passed through a fixed bed reactor containing catalyst similar to Catalyst C described above, at approximately 900° F., atmospheric pressure, and at a space rate of approximately 0.75 volume of the reactant per hour per volume of catalyst. Hydrogen is employed for vaporizing the benzyl pyridine and passed through the reactor together with the benzyl pyridine, using 4 mols hydrogen to 1 mol of the benzyl pyridine. The vaporous reaction effluent is condensed with the formation of crystalline 2,3-benzpyrrocoline. Further cooling of the liquid in the reactor to about −8° C. yields further crystals of the benzpyrrocoline. Additional product may be recovered from the mother liquor by fractional distillation and any unreacted 2-benzyl pyridine may be recycled to the initial reactor.

In the same manner alkyl pyrrocolines are obtained from alkyl pyridines. Thus, for example, 2-n-amyl pyridine is converted to 3-ethyl pyrrocoline. In the case of the alkyl pyrrocolines lower temperatures are ordinarily recommended in the range of about 800–875° F.

*Example IV*

The following example is typical of the preparation of compounds containing a carbazole nucleus by the dehydrocyclization of a 2-aryl aniline type compound.

A 50 weight percent solution of 2-amino biphenyl in benzene is passed over catalyst similar to that described in the previous example together with 3 mols of hydrogen per mol of 2-amino biphenyl at a reaction temperature of 860° F. and a liquid hourly space velocity of about 0.75 volume of the amino biphenyl per hour per volume of catalyst. The vapor effluent is condensed and cooled with resulting crystallization of carbazole and the mother liquor redistilled for additional recovery of solid product. Then unreacted amino biphenyl is recycled for further contact with the catalyst.

In general the sulfur and oxygen analogues of the compounds described in the above examples are obtained under approximately the same conditions as the N-hetero compounds hereinbefore described.

Obviously many modifications and variations of the invention as hereinbefore set forth may be made without departing from the spirit and scope thereof and therefore only such limitations should be imposed as are indicated in the appended claims.

We claim:

1. The method of carrying out dehydrocyclization reactions effecting carbon to nitrogen ring closure of a precursor compound selected from the group consisting of ortho ethyl aniline, ortho phenyl aniline, 2-benzyl pyridine and 2-alkyl pyridine having 3 to 5 carbon atoms in the alkyl chain; which method comprises contacting such precursor compound in vapor state with solid catalyst prepared by impregnation of activated alumina with chloroplatinic acid and vapor phase sulfidation of the thus impregnated alumina in dry state.

2. The method of preparing indole which comprises subjecting ortho ethyl aniline to contact at above 800° F. with solid catalyst prepared by vapor phase sulfidation of the product obtained by impregnation of porous alumina with a platinum compound.

3. The method of producing indole by dehydrocyclization of o-ethyl aniline, which comprises contacting the o-ethyl aniline in vapor state with solid catalyst prepared by impregnation of activated alumina with chloroplatinic acid and treating the impregnated alumina with hydrogen sulfide gas to convert the platinum to sulfided state followed by reduction of the sulfided catalyst at least in part to free platinum metal.

References Cited in the file of this patent

UNITED STATES PATENTS

| | | |
|---|---|---|
| 2,409,676 | Gresham et al. | Oct. 22, 1946 |
| 2,658,028 | Haensel et al. | Dec. 14, 1951 |

OTHER REFERENCES

Zelinsky et al.: Ber. Deut. Chem., vol. 59, pp. 2592–3 (1926).

Hettinger et al.: Ind. and Eng. Chem., vol. 47, pp. 719–30 (1955).